(12) United States Patent
Krauss et al.

(10) Patent No.: US 9,947,107 B2
(45) Date of Patent: Apr. 17, 2018

(54) METHOD AND SYSTEM FOR TRACKING OBJECTS BETWEEN CAMERAS

(71) Applicant: AGT INTERNATIONAL GMBH, Zurich (CH)

(72) Inventors: Stephan Krauss, Kaiserslautern (DE); Jan Hirzel, Kaiserslautern (DE)

(73) Assignee: AGT INTERNATIONAL GMBH, Zurich (CH)

( * ) Notice: Subject to any disclaimer, the term of this patent is extended or adjusted under 35 U.S.C. 154(b) by 134 days.

(21) Appl. No.: 14/855,762

(22) Filed: Sep. 16, 2015

(65) Prior Publication Data

US 2017/0076468 A1 Mar. 16, 2017

(51) Int. Cl.
*G06T 7/00* (2017.01)
*G06T 7/20* (2017.01)
*H04N 7/18* (2006.01)

(52) U.S. Cl.
CPC .......... *G06T 7/2093* (2013.01); *G06T 7/0018* (2013.01); *G06T 7/204* (2013.01); *G06T 2207/30232* (2013.01)

(58) Field of Classification Search
CPC .................................................... G06T 7/2093
See application file for complete search history.

(56) References Cited

U.S. PATENT DOCUMENTS 7,450,735 B1* 11/2008 Shah .................. G06T 7/292
348/143

2006/0245617 A1* 11/2006 Shan .................. G06K 9/00791
382/103
2011/0044499 A1* 2/2011 Cobb ................. G06K 9/00771
382/103
2013/0100286 A1 4/2013 Lao
2014/0193040 A1* 7/2014 Bronshtein ............. G06T 7/246
382/107

(Continued)

OTHER PUBLICATIONS

Huang, et al "Object Identification in a Bayesian Context" In IJCAI. 97 : 1276-1282 (Aug. 1997).

(Continued)

*Primary Examiner* — Christopher S Kelley
*Assistant Examiner* — Asmamaw G Tarko
(74) *Attorney, Agent, or Firm* — Browdy and Neimark, PLLC (57) ABSTRACT

A method, system and non-transitory computer readable storage medium, the computer-implemented method comprising: receiving a first image captured by a first capture device, the first images depicting first objects; obtaining a kinematic value for each of the first objects; receiving a second image captured by a second capture device, the second images depicting second objects; and analyzing the first and second images and the kinematic value, to determine transition parameters related to transition of objects from a first field of view of the first capture device to a second field of view of the second capture device, wherein the first capture device and the second capture device are calibrated, wherein a gap exists between the first and the second fields of view, and wherein said transition parameters are usable for associating further objects captured by the first capture device with corresponding objects captured by the second capture device.

15 Claims, 5 Drawing Sheets

(56) References Cited

U.S. PATENT DOCUMENTS

2014/0211012 A1    7/2014  Nerayoff et al.

OTHER PUBLICATIONS

Javed et al "Automated Multi-Camera Surveillance: Algorithms and Practice" Springer Science & Business Media. 10 :66-67 (2008).
Kettnaker et al "Bayesian Multi-camera Surveillance" In computer Vision and Pattern Recognition. IEE Computer Society Conference on. (1999).

* cited by examiner

METHOD AND SYSTEM FOR TRACKING OBJECTS BETWEEN CAMERAS

TECHNICAL FIELD

The present disclosure relates to tracking objects between a multiplicity of cameras in general, and to a method and system for tracking objects between cameras having non-overlapping fields of view, in particular.

BACKGROUND

In today's environment, many public as well as private areas around the world are being continuously or intermittently captured by surveillance devices such as cameras and in particular video cameras.

However, it is practically impossible to fully cover a large area, such that all people or objects in the area are captured at every given moment, and there may exist gaps between the fields of view captured by different cameras, such as between cameras capturing areas along a road.

"Automated Multi-Camera Surveillance: Algorithms and Practice" by Omar Javed and Mubarak Shah. Springer, 2008, and U.S. Pat. No. 7,450,735 to Shah et al. disclose tracking and surveillance methods and systems for monitoring objects passing in front of non-overlapping cameras. The documents disclose finding corresponding tracks from different cameras and working out which object passing in front of the camera(s) made the tracks, in order to track the object from camera to camera. The documents disclose the usage of an algorithm to learn inter-camera spatial temporal probability using Parzen windows, and the inter-camera appearance probabilities using distribution of Bhattacharyya distances between appearance models, to establish correspondences based on Maximum A Posteriori (MAP) framework combining both spatial temporal and appearance probabilities, and to update learned probabilities throughout the lifetime of the system.

"Bayesian multi-camera surveillance" by V. Kettnaker and R. Zabith in International Conference on Computer Vision and Pattern Recognition, pages 117-123, 1999, discloses that the task of multi-camera surveillance is to reconstruct the paths taken by all moving objects that are temporarily visible from multiple non-overlapping cameras. A Bayesian formalization of this task is disclosed, where the optimal solution is the set of object paths with the highest posterior probability given the observed data. It is shown how to efficiently approximate the maximum a posteriori solution by linear programming.

"Object identification in a Bayesian context" by T. Huang and S. Rusell, in Proceedings of IJCAI, 1997 discloses that object identification—the task of deciding that two observed objects are in fact one and the same object—is a fundamental requirement for any situated agent that reasons about individuals. Object identity, as represented by the equality operator between two terms in predicate calculus, is essentially a first-order concept. Raw sensory observations, on the other hand, are essentially propositional, especially when formulated as evidence in standard probability theory. The paper describes patterns of reasoning that allow identity sentences to be grounded in sensory observations, thereby bridging the gap. We begin by defining a physical event space over which probabilities are defined. An identity criterion is introduced which selects those events that correspond to identity between observed objects. From this, we are able to compute the probability that any two objects are the same, given a stream of observations of many objects. It is shown that the appearance probability, which defines how an object can be expected to appear at subsequent observations given its current appearance, is a natural model for this type of reasoning. The theory is applied to the task of recognizing cars observed by cameras at widely separated sites in a freeway network, with new heuristics to handle the inevitable complexity of matching large numbers of objects and with online learning of appearance probability models.

BRIEF SUMMARY

One exemplary embodiment of the disclosed subject matter is a computer-implemented method comprising: receiving one or more first images captured by a first capture device, the first images depicting a first multiplicity of objects; obtaining a kinematic value for each of the first multiplicity of objects; receiving one or more second images captured by a second capture device, the second images depicting a second multiplicity of objects; an analyzing the first images, the second images, and the kinematic value, to determine transition parameters related to transition of objects from a first field of view of the first capture device to a second field of view of the second capture device, wherein the first capture device and the second capture device are calibrated, wherein a gap exists between the first field of view and the second field of view, and wherein said transition parameters are usable for associating further objects captured by the first capture device with corresponding objects captured by the second capture device. Within the method the transition parameters optionally comprise one or more parameters selected from the group consisting of: lane offset parameter, lane offset parameter variance, speed correction and speed correction variance. The method may further comprise determining calibration between the first capture device and the second capture device. Within the method, determining the transition parameters optionally comprises: selecting from a first initial multiplicity of objects appearing in one of the first images a first potential multiplicity of objects and selecting from a second initial multiplicity of objects appearing in one of the second images a second potential multiplicity of objects, such that each of the first potential multiplicity of objects can plausibly be associated with one of the second potential multiplicity of objects, and each of the second potential multiplicity of objects can plausibly be associated with one of the first potential multiplicity of objects; responsive to determining the first potential multiplicity of objects and the second potential multiplicity of objects, creating a correspondence data structure between the first potential multiplicity of objects and the second potential multiplicity of objects; selecting from the correspondence data structure a multiplicity of matches between objects captured by the first capture device and objects captured by the second capture device; and determining the transition parameters based on locations of the objects in the multiplicity of matches, and kinematic parameters of the objects in the first potential multiplicity of objects. The method may further comprise enhancing the correspondence data structure with data relating to shape or color correspondence between the first potential multiplicity of objects and the second potential multiplicity of objects. Within the method determining whether a first object from the first potential multiplicity of objects can plausibly be associated with a second object form the second potential multiplicity of objects optionally comprises: determining a first distance as a distance between a location of the second object and a location of the first object; estimating a second distance by combining a time difference between when the first object was last captured by the first capture device and when the second object was first captured by the second capture device with the kinematic value of the first object; and subject to the first distance and the second distance differing by at most a predetermined value, determining that the first object can plausibly be associated with the second object. Within the method determining the transition parameters optionally comprises calculating a speed correction factor and a speed correction factor variance, said calculating comprising: retrieving a speed $v_m$ measured for each object captured by the first capture device; determining a speed $v_e$ as $$v_e = \frac{\Delta s}{\Delta t}$$

wherein $\Delta s$ equals a distance between a location of the second object of the match as captured by the second capture device and a location of the first object of the match as captured by the first capture device, and $\Delta t$ is a time difference between when the second object of the match was captured by the second capture device and when the first object of the match was captured by the first capture device; determining a speed ratio value $$v_r = \frac{v_e}{v_m}$$

for each match; determining a median of the speed ratio values of all matches; estimating the speed correction factor as an arithmetic mean of the speed ratio values, excluding the speed ratio values which deviate from the median by more than a predetermined threshold; and estimating the speed correction factor variance parameter as a variance of the speed ratio values excluding the speed ratio for which the median deviates more than a predetermined threshold. Within the method, determining the transition parameters optionally comprises calculating a lane offset parameter and a lane offset variance parameter, said calculating comprising: estimating the lane offset parameter as $$l_m = \frac{1}{n}\sum_{i=0}^{n}(p_{i,2} - p_{i,1}),$$

wherein $p_{i,1}$ is a last known location of matched object i in a field of view of the first capture device, $p_{i,2}$ is a first known location of matched object i in the field of view of the second capture device, and n is the number of matched objects; and estimating the lane offset variance parameter as $$\frac{1}{n-1}\sum_{i=0}^{n}(p_{i,2} - p_{i,1} - l_m)^2.$$

Another exemplary embodiment of the disclosed subject matter is a computerized system for determining transition parameters between objects appearing in a first image captured by a first capture device and objects appearing in a second image captured by a second capture device, the system comprising a processor configured to: receive one or more first images captured by a first capture device, the first images depicting a first multiplicity of objects; obtain a kinematic value for each of the first multiplicity of objects; receive one or more second images captured by a second capture device, the second images depicting a second multiplicity of objects; and analyze the first images, the second images, and the kinematic value to determine transition parameters related to transition of objects from a first field of view of the first capture device to a second field of view of the second capture device, wherein the first capture device and the second capture device are calibrated, wherein a gap exists between the first field of view and the second field of view, and wherein said transition parameters are usable for associating further objects captured by the first capture device with corresponding objects captured by the second capture device. Within the computerized system, the transition parameters optionally comprise one or more parameters selected from the group consisting of: lane offset parameter, lane offset parameter variance, speed correction and speed correction variance. Within the computerized system, the processing unit is optionally further configured to determine calibration between the first capture device and the second capture device. Within the computerized system, as part of determining the transition parameters the processing unit is optionally configured to: determine whether each of an initial first multiplicity of objects captured by the first capture device can plausibly be associated with each of a second initial multiplicity of objects captured by the second capture device; responsive to determining a first potential multiplicity of objects captured by the first capture device that can plausibly be associated with a second potential multiplicity of objects captured by the second capture device, create a correspondence data structure between the first potential multiplicity of objects and the second potential multiplicity of objects; select from the correspondence data structure a multiplicity of matches between objects captured by the first capture device and objects captured by the second capture device; and determine the transition parameters based on locations and kinematic values of the objects in the multiplicity of matches. Within the computerized system, the processing unit is optionally further configured to enhance the correspondence data structure with data relating to shape or color of the first potential multiplicity of objects and the second potential multiplicity of objects. Within the computerized system, as part of determining whether a first object captured by the first capture device can plausibly be associated with a second object captured by the second capture device, the processing unit is optionally configured to: determine a first distance as a distance between a location of the second object and a location of the first object; estimate a second distance as a distance the first object has passed since leaving the field of view of the first capture device, by combining a time difference between when the first object was last captured by the first capture device and when the second object was first captured by the second capture device with the kinematic value of the first object; and subject to the first distance and the second distance differing by at most a predetermined value, determine that the first object can plausibly be associated with the second object. Within the computerized system, as part of determining the transition parameters the processing unit is optionally configured to calculate a speed correction factor and a speed correction factor variance by: retrieving a speed $v_m$ measured for each object captured by the first capture device; determining a speed $v_e$ as $$v_e = \frac{\Delta s}{\Delta t}$$

wherein Δs equals a distance between a location of the second object of the match as captured by the second capture device and a location of the first object of the match as captured by the first capture device, and Δt is a time difference between when the second object of the match was captured by the second capture device and when the first object of the match was captured by the first capture device; determining a speed ratio value $$v_r = \frac{v_e}{v_m}$$

for each match; determining a median of the speed ratio values of all matches; estimating the speed correction factor as an arithmetic mean of the speed ratio values excluding the speed ratio values which deviate from the median by more than a predetermined threshold; and estimating the speed correction factor variance parameter as a variance of the speed ratio values excluding the speed ratio for which the median deviates more than a predetermined threshold. Within the computerized system, as part of determining the transition parameters the processing unit is optionally configured to calculate a lane offset parameter and a lane offset variance parameter by: estimating the lane offset parameter as $$l_m = \frac{1}{n}\sum_{i=0}^{n}(p_{i,2} - p_{i,1}),$$

wherein $p_{i,1}$ is a last known location of matched object i in the field of view of the first capture device, $p_{i,2}$ is a first known location of matched object i in the field of view of the second capture device, and n is the number of matched objects; and estimating the lane offset variance parameter as $$\frac{1}{n-1}\sum_{i=0}^{n}(p_{i,2} - p_{i,1} - l_m)^2.$$

Yet another exemplary embodiment of the disclosed subject matter is a non-transitory computer readable storage medium tangibly embodying a program of instructions executable by a machine to determine transition parameters between objects appearing in a first image captured by a first capture device and objects appearing in a second image captured by a second capture device, comprising the steps of: receiving one or more first images captured by a first capture device, the first images depicting a first multiplicity of objects; obtaining a kinematic value for each of the first multiplicity of objects; receiving one or more second images captured by a second capture device, the second images depicting a second multiplicity of objects; and analyzing the first images, the second images, and the kinematic value to determine transition parameters related to transition of objects from a first field of view of the first capture device to a second field of view of the second capture device, wherein the first capture device and the second capture device are calibrated, wherein a gap exists between the first field of view and the second field of view, and wherein said transition parameters are usable for associating further objects captured by the first capture device with corresponding objects captured by the second capture device.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem relates to tracking objects such as vehicles, humans or other objects captured by a multiplicity of capturing devices such as video cameras, between cameras.

In many applications it is required to track an object, for example following one or more suspects of a crime, analyzing the track of a missing person or object, making sure every object that entered an area has also left it, or the like.

Multiple methods exist for tracking an object within a multiplicity of images capturing a field of view of one camera. Further methods exist for tracking an object when the object leaves the field of view of the first camera, and appears in the field of view of a second camera, if the fields of view of the first and second cameras are overlapping or at least adjacent to each other.

However, this is not always feasible. In many situations the fields of view are disjoint, and there is a gap between the fields of view of cameras. In some situations the gaps are significantly larger than the captured fields of view.

For example, in freeway monitoring, cameras may be located at predetermined distances from each other, such as 1 km, 10 km or the like, or at predetermined locations such as at intersections, interchanges, or the like. A similar situation may occur along a street in which cameras are positioned capturing objects such as pedestrians, vehicles, or the like, wherein gaps exist between the fields of view captured by different cameras.

Currently existing techniques do not enable automatic tracking of objects between disjoint fields of view, or require significant human labor, either at a preparation or training stage or when actually tracking an object.

Figure 1:
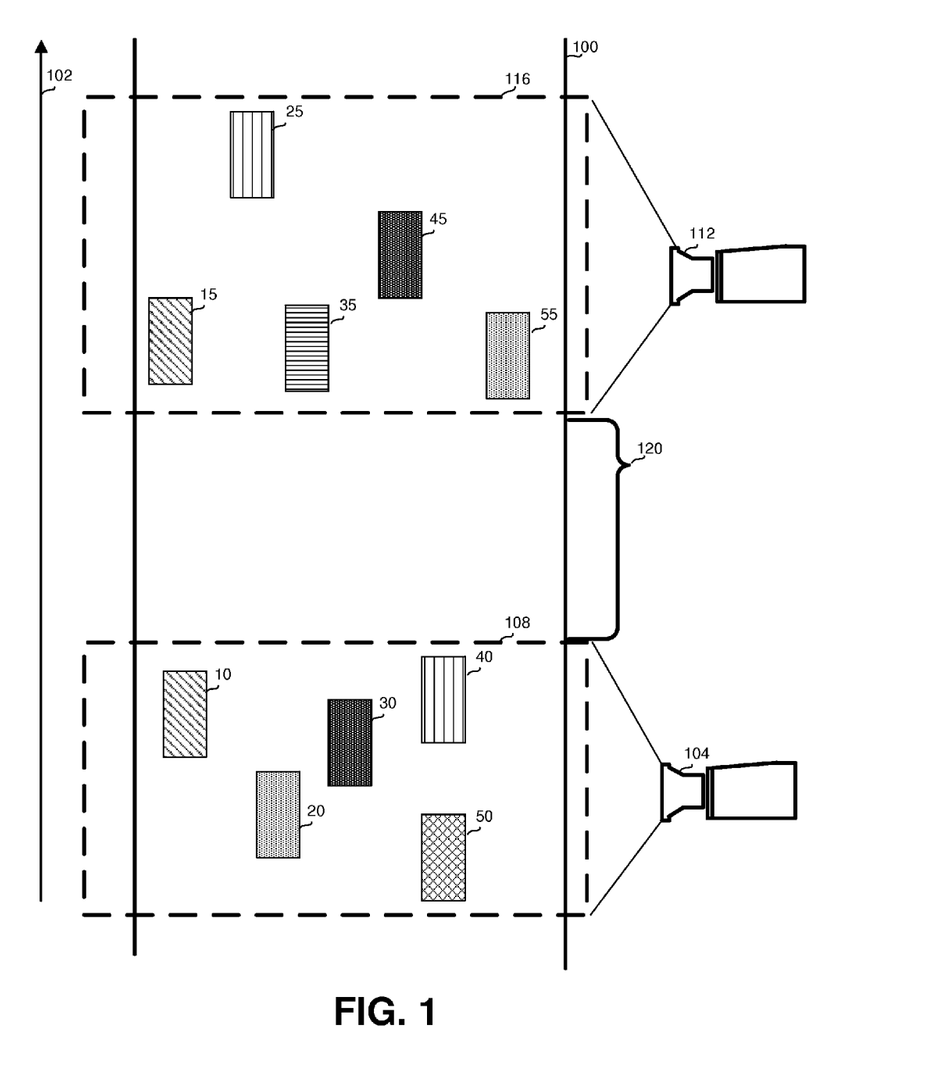
FIG. 1 shows an exemplary illustration of an environment in which the disclosed subject matter may be used.

Referring now to FIG. 1, showing a schematic illustration of an environment in which it may be required to track objects between disjoint fields of view. Although FIG. 1 relates to a road and vehicles, it will be appreciated that the disclosure is not limited to such environment and may be used in any other environment as well.

FIG. 1 depicts cars traveling along road 100 in direction 102. Camera 104 captures field of view 108 and camera 112 captures field of view 116. Field of view 108 and field of view 116 are disjoint and are separated by gap 120. It will be appreciated that gap 120 may be significantly longer than any dimension of field of view 108 and of field of view 116. For example, a field of view may be in the order of magnitudes of meters to hundreds of meters, while gap 120 may be in the order of magnitude of kilometers. It will be appreciated that camera 104 and camera 112 may be video cameras which capture images of the respective fields of view at high rate. Alternatively, camera 104 and camera 112 may be still cameras that capture images at predetermined time intervals, whenever a certain event occurs such as a car exceeding the speed limit, or the like.

At a particular point in time, $t_0$, camera 104 may capture an image of field of view 108, in which cars 10, 20, 30, 40 and 50 appear, the image referred to as the first image.

At a later point in time, $t_1$, camera 112 may capture an image of field of view 116, in which cars 15, 25, 35, 45 and 55 appear, the image referred to as the second image.

It will be appreciated that different car patterns in FIG. 1 represent different colors or shapes.

It will be appreciated that the first image and the second image may be selected such that the time difference between $t_0$ and $t_1$ is in accordance, for example, with the average speed in which cars travel in gap 120, and the distance between the locations of camera 104 and camera 112. In some embodiments, during a training or preparation step, the images may be selected such that the first image shows a certain object, such as a particular car, for the last time in field of view 108, and the second image shows the object for the first time in field of view 116.

One technical solution comprises the determination of transition parameters describing the transition of objects between fields of view, in a preparation or training stage. The transition parameters may later be used in runtime when it is required to track an object between the fields of view.

In some embodiments of the disclosure, the transition parameters may include one or more of the following parameters: lane offset, lane offset variance, speed correction and speed correction variance. These parameters may prove highly useful for locating an object that left the first field of view when the object arrives to the second field of view, and keep tracking it.

For assessing transition parameters between the disjoint fields of view, it is first required to match one or more of cars 10, 20, 30 40 or 50 in the first image with corresponding cars from cars 15, 25, 35, 45 and 55 in the second image.

Once the matching car pairs are determined, the transition parameters may be determined, and later used in tracking further cars.

One technical effect of the disclosure relates to providing transition parameters for tracking objects appearing in a first field of view, in a second field of view, wherein the fields of view are disjoint and a gap exists therebetween, which may be used in a multiplicity of applications.

The methods provide for efficient determination of the parameters without requiring significant human labor or manual input of the topology of possible paths in the gap area.

Figure 2:
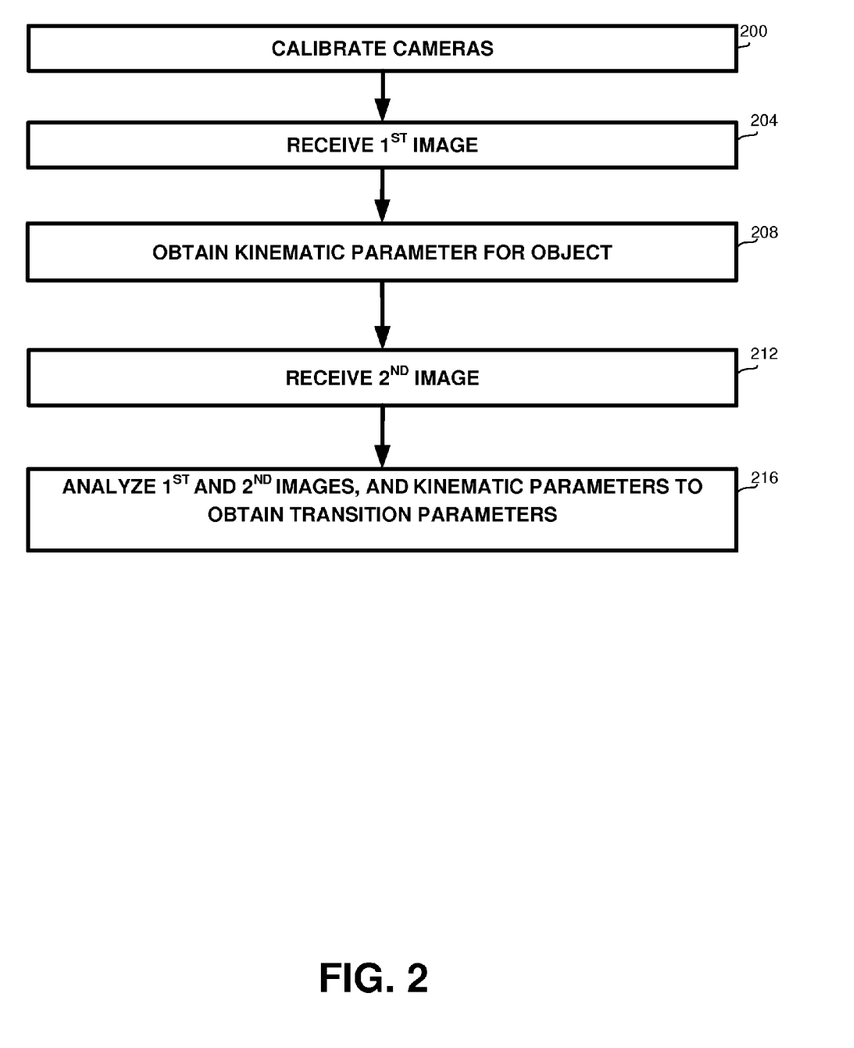
FIG. 2 shows a flowchart of steps in a method for determining transition parameters of objects between cameras having disjoint fields of view, in accordance with some exemplary embodiments of the disclosed subject matter.

Referring now to FIG. 2, showing a flowchart of steps in a method for determining transition parameters of objects between cameras having disjoint fields of view, in accordance with some embodiments of the disclosure.

On step 200 the respective first and second cameras may be calibrated. Calibration may relate to determining the spatial location of the cameras relatively to each other or on the same coordinate system, e.g., determining the distance between the corresponding fields of view in each dimension, the scale, skewing, or the like. In some embodiments, calibration may relate to real world coordinates and the relative difference between locations in real world distances, expressed for example in kilometers, meters, centimeters, etc., Alternatively, the location and distances may be expressed in any other coordinate system. Calibration may also relate to color calibration, e.g., determining the differences in the way the same color appears in images taken by the two cameras. It will be appreciated that color calibration may be different for different hours of the day.

It will be appreciated that calibration may be performed once, periodically, when placing a camera, or the like.

In the steps below, reference to a "first" relates to an image, parameters, objects or other entities associated with the first camera, such as camera 104 of FIG. 1, and reference to a "second" relates to an image, parameters, objects or other entities associated with the second camera, such as camera 112 of FIG. 1. It will be appreciated that the description below relates to image combinations in which images captured by the first camera precede images captured by the second camera.

In some situations, for example a two way road, a first pair of images in which one camera is the first and the other is second may be analyzed, obtaining a first set of parameters, followed by analyzing a "reverse" pair in which the second camera captures the first image and vice versa, and obtaining a second set of parameters. The first parameter set may be used for traffic going in one way while the second set may be used for traffic going in the other way.

On step 204, at least one first image taken by the first camera may be received, and on step 208 a kinematic parameter related to an object appearing in the first image may be obtained. The kinematic parameter may be velocity, acceleration, or the like. The kinematic parameter may be received from an external source.

Alternatively, the kinematic parameter may be determined from two or more first images captured by the first camera, and by tracking an object between the two or more first images.

It will be appreciated that the kinematic parameters may be received or determined for a multiplicity of objects appearing in the first images.

On step 212 at least one second image may be received.

On step 216, the at least first and at least second images, and the kinematic parameters may be processed, as described below, to obtain transition parameters between the corresponding fields of views.

Figure 3:
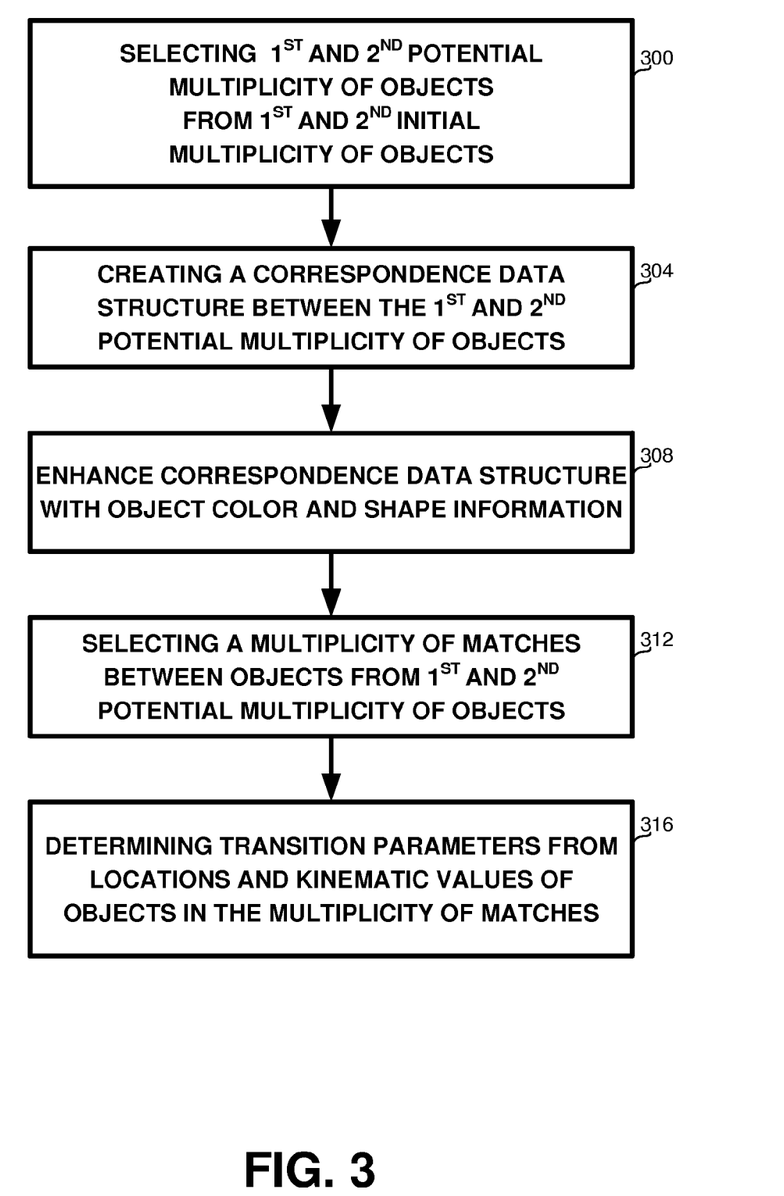
FIG. 3 shows a flowchart of steps in a method for processing images and kinematic parameters to obtain transition parameters of objects between cameras, in accordance with some exemplary embodiments of the disclosed subject matter.

Referring now to FIG. 3, showing a flowchart of steps in a method for processing the at least first and at least second images, and the kinematic parameters, to obtain the transition parameters.

On step 300, one or more first potential objects appearing in the first image, and one or more second potential objects appearing in the second image are selected from initial objects appearing in the two images, such that each object in the first potential objects can be matched to an object in the second potential objects, and vice versa, wherein the first image and the second image are captured by capture devices having disjoint fields of view.

Forming the first and second potential objects is detailed in association with FIG. 4 below.

In the example of FIG. 1, it may be determined that the first potential objects include objects 10, 20, 30 and 40, and that the second potential objects include objects 15, 25, 45 and 55.

On step 304, a correspondence data structure may be created of the first and second potential objects. In a non-limiting example, the correspondence data structure may be a correspondence matrix whose rows correspond to the first potential objects and columns correspond to the second potential objects, or vice versa.

The matrix may have a value of 0 in each entry corresponding to a row and a column in which the first object associated with the row and the second object associated with the column cannot be plausibly associated with each other, and another value such as 1, otherwise. However, as detailed in association with FIG. 4, if each such plausible association is assigned a rank, the value of the entry in the table corresponding to the pair may be set to the rank or to a value based on the rank.

Figure 4:
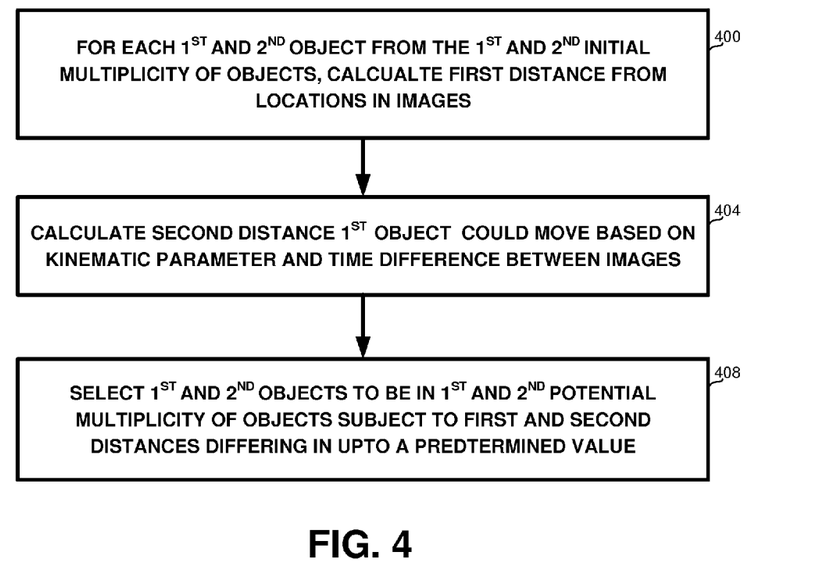
FIG. 4 shows a flowchart of steps in a method for determining potential matching objects from objects appearing in the first image and in the second image, in accordance with some exemplary embodiments of the disclosed subject matter.

In the example of FIG. 1, the entry corresponding to object 10 and object 55 may be set to zero due to the distance therebetween, while the entries corresponding to object 10 and objects 15, 25, 45 may be set to 1 or to any other value, as detailed in association with FIG. 4.

On step 308, the correspondence data structure may be enhanced with setting values other than 1 to object pairs, based on color or shape matching between the object associated with the row and the object associated with the column. It will be appreciated that step 308 may also be performed as part of determining the potential objects, as detailed in association with FIG. 4 below.

In some exemplary embodiments, color matching may be computed as one minus the Hellinger distance of the color histogram of the object in the first image and the color histogram of the object in the second image.

In some exemplary embodiments, color matching may be computed as the Bhattacharyya coefficient of the histograms of oriented gradients (HOG) of the object in the first image and the HOG of the object in the second image.

In the example of FIG. 1, the entry corresponding to objects 10 and 15 may be set to 1, the entry corresponding to objects 10 and 25 may be set to 0.5, and the entry corresponding to objects 10 and 45 may be set to 0.1.

On step 312, a multiplicity of matches may be selected from the correspondence data structure, representing a multiplicity of matches between objects from the first and the second potential objects. In some embodiments, the selection may be performed as follows:

The entry having the highest value in the matrix may be selected. In some embodiments, this entry may be selected subject to its value being higher in at least a predetermined threshold from the second highest value in the same row.

The first and second objects associated with the row and column of the selected entry, respectively, may be added to the matches, and the row and column of the entry are stricken out.

The next highest value is then selected in a similar manner, and so on, until all rows are stricken out. The resulting matches may then be provided.

It will be associated that the selection may also be performed column-based rather than row-based.

In the example of FIG. 1, the following matches may be provided: object 10 with object 15, object 30 with object 45, and object 40 with object 25. Some pairs, such as object 20 and object 55 may be missed.

On step 316, the transition parameters may be determined based upon the provided matching pairs and the kinematic parameters associated with the objects appearing in the first image. The transition parameters determination is detailed in FIG. 5 below.

Referring now to FIG. 4, showing a flowchart of steps in a method for determining first potential objects appearing in the first image and second potential objects appearing in the second image, such that each object in the first potential objects can be matched to an object in the second potential objects, and vice versa. It will, however, be appreciated that this method is exemplary only and other methods may be used.

On step 400, for each pair consisting of a first object appearing in one or more first images taken by the first camera and a second object appearing in one or more second images taken by the second camera, a first distance is calculated between the location at which the first object was last seen in the first field of view, and the location at which the second object was first seen in the second field of view.

On step 404, a second distance is calculated by combining value of the kinematic parameter associated with the first object and the time difference between the first and the second image. In a non-limiting example, if the kinematic parameter is velocity, the combination is a product of the velocity by the time, yielding a distance.

On step 408, the first distance and the second distance are compared. If the distances differ in at most a predetermined value, then the first object is added to first potential objects and the second object is added to second potential objects.

It will be appreciated that the second distance may be calculated once for each object in the first image, and the calculation does not have to be repeated for each second object.

In some embodiments, the distance difference may be inverted and normalized, and assigned as a rank to the match, such that the rank is higher as the difference between the distances is smaller. The rank may be set to zero if the difference exceeds the predetermined value.

As mentioned above, step 308 of enhancing the correspondence with color or shape information may also be performed as part of determining the potential pairs.

Figure 5:
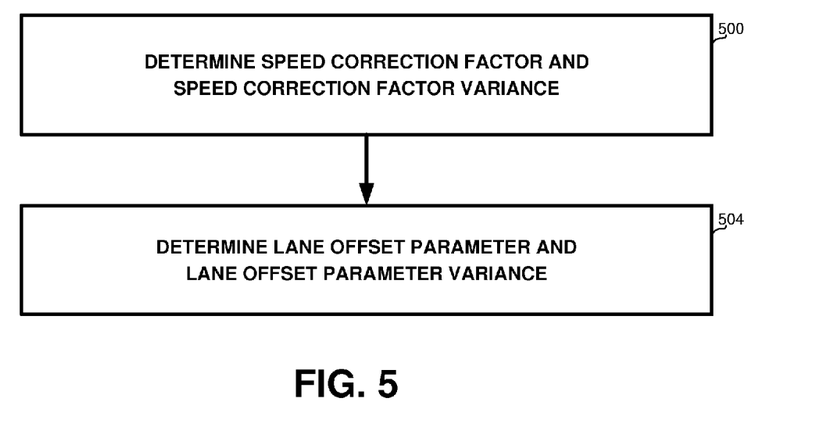
FIG. 5 shows a flowchart of steps in a method for determining transition parameters upon objects appearing in the first and the second fields of view, in accordance with some exemplary embodiments of the disclosed subject matter.

Referring now to FIG. 5, showing a flowchart of steps in a method for determining transition parameters upon objects pairs in the first and the second fields of view, wherein the object pairs were determined to be the same object as appearing in two images.

It will be appreciated that the parameters determined as detailed below are exemplary only and other parameters may be determined for tracking objects captured in the first field of view within the second field of view. Further, the methods disclosed below for determining the parameters are also exemplary and the same parameters may be determined using other methods as well.

On step 500 the speed correction factor and the speed correction factor variance may be determined as follows:

The speed measured for each object in the first image, $v_m$, as obtained on step 204, may be retrieved.

The speed required for each object to move from its location in the first image to its location in the second image, $v_e$, is determined, by dividing the absolute distance between the locations by the time difference between the images.

The speed ratio $v_r = v_e/v_m$ may then be determined for each match.

The median of all speed ratios may be determined, and all speed ratio values diverging from the median in at least a predetermined threshold may be discarded.

The speed correction factor parameter may then be determined as the average of the remaining speed ratios values.

The speed correction factor variance parameter may then be determined as the sample variance of the remaining speed ratio values.

On step 504, the lane offset parameter may be computed as $$l_m = \frac{1}{n}\sum_{i=0}^{n}(p_{i,2} - p_{i,1}),$$

where $p_{i,1}$ is the last known location of object i in the first camera, $p_{i,2}$ is the first known location of object i in the second camera and n is the total number of matched objects, after the selection performed on step 312.

The lane offset variance parameter may be determined as $$l_\sigma = \frac{1}{n-1}\sum_{i=0}^{n}(p_{i,2} - p_{i,1} - l_m)^2.$$

It will be appreciated that step 500 may be performed before, after or concurrently with step 504, since there is no dependence therebetween.

Figure 6:
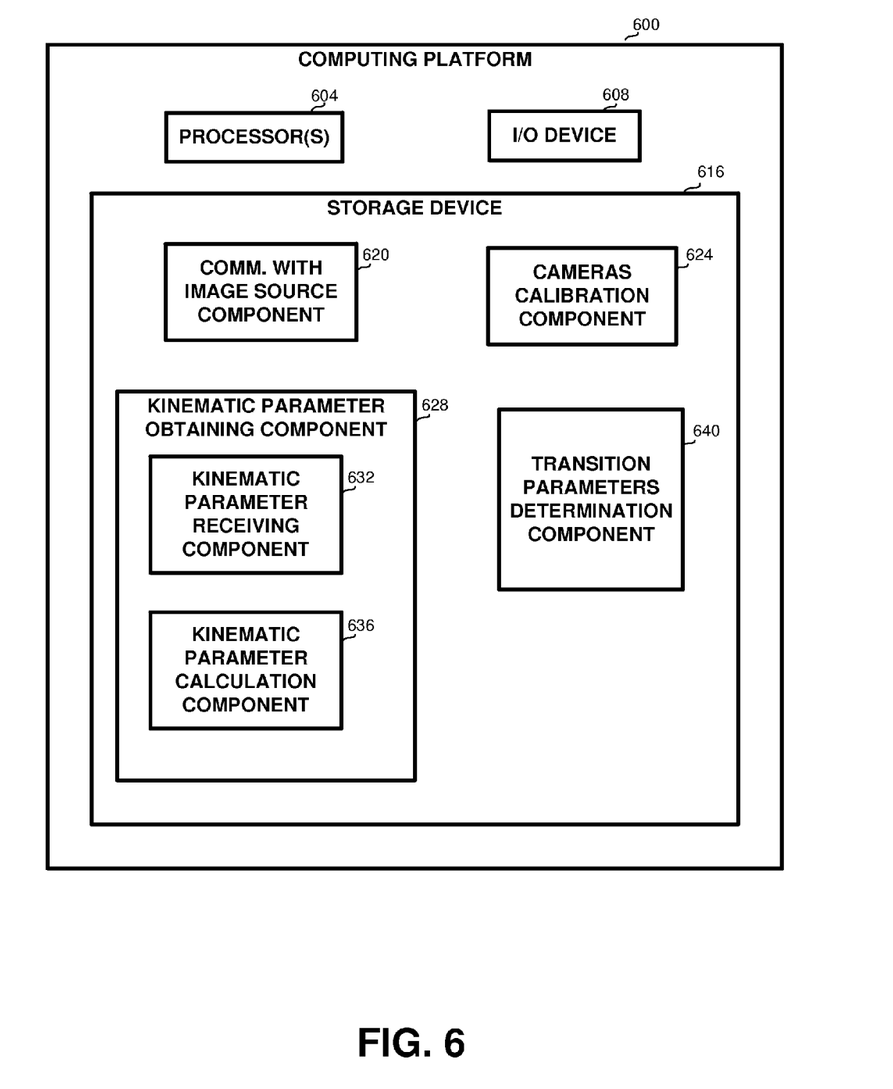
FIG. 6 shows a block diagram of a system for tracking objects between cameras, in accordance with some exemplary embodiments of the disclosed subject matter.

Referring now to FIG. 6, showing a block diagram of an apparatus for tracking objects between cameras having disjoint fields of view.

The apparatus may comprise one or more computing platforms 600, which may execute any one or more of the methods of FIGS. 2-5 above.

In some exemplary embodiments, computing platform 600 may comprise a processor 604. Processor 604 may be a Central Processing Unit (CPU), a microprocessor, an electronic circuit, an Integrated Circuit (IC) or the like. Processor 604 may be utilized to perform computations required by computing platform 600 or any of it subcomponents.

In some exemplary embodiments of the disclosed subject matter, computing platform 600 may comprise an Input/Output (I/O) device 608 such as a display, a keyboard, voice input or output device, or the like.

In some exemplary embodiments, computing platform 600 may comprise a storage device 616. Storage device 616 may be a hard disk drive, a Flash disk, a Random Access Memory (RAM), a memory chip, or the like. In some exemplary embodiments, storage device 616 may retain program code operative to cause processor 604 to perform acts associated with any of the subcomponents of computing platform 600. Storage device 616 may also store questions or challenges presented to the driver, known answers to the questions or the driver's answers, driver's score, or the like.

Storage device 616 may comprise one or more components as detailed below, implemented as executables, libraries, static libraries, functions, or any other executable components. In runtime, the components may be loaded to a memory unit of computing platform 600, to be executed by processor 604.

Storage device 616 may store a communication with image source component 620, for communicating with one or more sources of images, such as one or more cameras or video cameras, a storage device storing images, or the like.

Storage device 616 may store a cameras calibration component 624, for calibrating one or more cameras. Cameras calibration component 624 may comprise sub components for identifying details in images, retrieving and manipulating Global Positioning System (GPS) data, color comparison, or the like.

Storage device 616 may store kinematic parameter obtaining component 628, which may comprise either one or both of: kinematic parameter receiving component 632 for receiving numerical values for one or more objects appearing in an image received by communication with image source component 620, and kinematic parameter calculating component 636 for determining a kinematic parameter associated with an object appearing in two or more images, such as two or more images captured by one camera.

Storage device 616 may store transition parameters determination component 640, for determining transition parameters, based upon at least two images captured by capture devices having disjoint fields of views, and one or more kinematic parameters of objects appearing in the image captured earlier, or based upon a multiplicity of images captured by the first capture device and at least one image captured by the second capture device. The determination may be performed as described in association with FIGS. 3-5 above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It will also be noted that each block of the block diagrams and/or flowchart illustration may be performed by a multiplicity of interconnected components, or two or more blocks may be performed as a single block or step.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A computer-implemented method comprising:
receiving at least one first image captured by a first capture device, the at least one first image depicting a first multiplicity of objects;
obtaining a kinematic value for each of the first multiplicity of objects;
receiving at least one second image captured by a second capture device, the at least one second image depicting a second multiplicity of objects; and analyzing the at least one first image, the at least one second image, and the kinematic value, to determine transition parameters related to transition of objects from a first field of view of the first capture device to a second field of view of the second capture device,
wherein determining the transition parameters comprises:
selecting from a first initial multiplicity of objects appearing in the at least one first image a first potential multiplicity of objects and selecting from a second initial multiplicity of objects appearing in the at least one second image a second potential multiplicity of objects, such that each of the first potential multiplicity of objects can plausibly be associated with one of the second potential multiplicity of objects, and each of the second potential multiplicity of objects can plausibly be associated with one of the first potential multiplicity of objects;
responsive to determining the first potential multiplicity of objects and the second potential multiplicity of objects, creating a correspondence data structure between the first potential multiplicity of objects and the second potential multiplicity of objects;
selecting from the correspondence data structure a multiplicity of matches between objects captured by the first capture device and objects captured by the second capture device; and
determining the transition parameters based on locations of the objects in the multiplicity of matches, and kinematic parameters of the objects in the first potential multiplicity of objects,
wherein the first capture device and the second capture device are calibrated,
wherein a gap exists between the first field of view and the second field of view, and
wherein said transition parameters are usable for associating further objects captured by the first capture device with corresponding objects captured by the second capture device.

2. The method of claim 1, wherein the transition parameters comprise at least one parameter selected from the group consisting of: lane offset parameter, lane offset parameter variance, speed correction and speed correction variance.

3. The method of claim 1 further comprising determining calibration between the first capture device and the second capture device.

4. The method of claim 1, further comprising enhancing the correspondence data structure with data relating to shape or color correspondence between the first potential multiplicity of objects and the second potential multiplicity of objects.

5. The method of claim 1, wherein determining whether a first object from the first potential multiplicity of objects can plausibly be associated with a second object from the second potential multiplicity of objects comprises:
determining a first distance as a distance between a location of the second object and a location of the first object;
estimating a second distance by combining a time difference between when the first object was last captured by the first capture device and when the second object was first captured by the second capture device with the kinematic value of the first object; and
subject to the first distance and the second distance differing by at most a predetermined value, determining that the first object can plausibly be associated with the second object.

6. The method of claim 1, wherein determining the transition parameters comprises calculating a speed correction factor and a speed correction factor variance, said calculating comprising:
retrieving a speed $v_m$ measured for each object captured by the first capture device;
determining a speed $v_e$ as $$v_e = \frac{\Delta s}{\Delta t}$$

wherein $\Delta s$ equals a distance between a location of the second object of the match as captured by the second capture device and a location of the first object of the match as captured by the first capture device, and $\Delta t$ is a time difference between when the second object of the match was captured by the second capture device and when the first object of the match was captured by the first capture device;
determining a speed ratio value $$v_r = \frac{v_e}{v_m}$$

for each match;
determining a median of the speed ratio values of all matches;
estimating the speed correction factor as an arithmetic mean of the speed ratio values, excluding the speed ratio values which deviate from the median by more than a predetermined threshold; and
estimating the speed correction factor variance parameter as a variance of the speed ratio values excluding the speed ratio for which the median deviates more than a predetermined threshold.

7. The method of claim 1, wherein determining the transition parameters comprises calculating a lane offset parameter and a lane offset variance parameter, said calculating comprising:
estimating the lane offset parameter as $$l_m = \frac{1}{n}\sum_{i=0}^{n}(p_{i,2} - p_{i,1}),$$

wherein $p_{i,1}$ is a last known location of matched object in a field of view of the first capture device, $p_{i,2}$ is a first known location of matched object i in the field of view of the second capture device, and n is the number of matched objects; and
estimating the lane offset variance parameter as $$\frac{1}{n-1}\sum_{i=0}^{n}(p_{i,2} - p_{i,1} - l_m)^2.$$

8. A computerized system for determining transition parameters between objects appearing in a first image captured by a first capture device and objects appearing in a second image captured by a second capture device, the system comprising a processor configured to:
receive at least one first image captured by a first capture device, the at least one first image depicting a first multiplicity of objects;

obtain a kinematic value for each of the first multiplicity of objects;

receive at least one second image captured by a second capture device, the at least one second image depicting a second multiplicity of objects; and analyze the at least one first image, the at least one second image, and the kinematic value to determine transition parameters related to transition of objects from a first field of view of the first capture device to a second field of view of the second capture device, wherein as part of determining the transition parameters the processing unit is configured to:

determine whether each of an initial first multiplicity of objects captured by the first capture device can plausibly be associated with each of a second initial multiplicity of objects captured by the second capture device;

responsive to determining a first potential multiplicity of objects captured by the first capture device that can plausibly be associated with a second potential multiplicity of objects captured by the second capture device, create a correspondence data structure between the first potential multiplicity of objects and the second potential multiplicity of objects;

select from the correspondence data structure a multiplicity of matches between objects captured by the first capture device and objects captured by the second capture device; and determine the transition parameters based on locations and kinematic values of the objects in the multiplicity of matches, wherein the first capture device and the second capture device are calibrated, wherein a gap exists between the first field of view and the second field of view, and wherein said transition parameters are usable for associating further objects captured by the first capture device with corresponding objects captured by the second capture device.

9. The computerized system of claim 8, wherein the transition parameters comprise at least one parameter selected from the group consisting of: lane offset parameter, lane offset parameter variance, speed correction and speed correction variance.

10. The computerized system of claim 8, wherein the processing unit is further configured to determine calibration between the first capture device and the second capture device.

11. The computerized system of claim 9, wherein the processing unit is further configured to enhance the correspondence data structure with data relating to shape or color of the first potential multiplicity of objects and the second potential multiplicity of objects.

12. The computerized system of claim 9, wherein as part of determining whether a first object captured by the first capture device can plausibly be associated with a second object captured by the second capture device, the processing unit is configured to:

determine a first distance as a distance between a location of the second object and a location of the first object;

estimate a second distance as a distance the first object has passed since leaving the field of view of the first capture device, by combining a time difference between when the first object was last captured by the first capture device and when the second object was first captured by the second capture device with the kinematic value of the first object; and subject to the first distance and the second distance differing by at most a predetermined value, determine that the first object can plausibly be associated with the second object.

13. The computerized system of claim 9, wherein as part of determining the transition parameters the processing unit is configured to calculate a speed correction factor and a speed correction factor variance by:

retrieving a speed $v_m$ measured for each object captured by the first capture device;

determining a speed $v_e$ as $$v_e = \frac{\Delta s}{\Delta t}$$

wherein equals a distance between a location of the second object of the match as captured by the second capture device and a location of the first object of the match as captured by the first capture device, $\Delta t$ and is a time difference between when the second object of the match was captured by the second capture device and when the first object of the match was captured by the first capture device;

determining a speed ratio value $$v_r = \frac{v_e}{v_m}$$

for each match;

determining a median of the speed ratio values of all matches;

estimating the speed correction factor as an arithmetic mean of the speed ratio values excluding the speed ratio values which deviate from the median by more than a predetermined threshold; and estimating the speed correction factor variance parameter as a variance of the speed ratio values excluding the speed ratio for which the median deviates more than a predetermined threshold.

14. The computerized system of claim 8, wherein as part of determining the transition parameters the processing unit is configured to calculate a lane offset parameter and a lane offset variance parameter by:

estimating the lane offset parameter as $$l_m = \frac{1}{n} \sum_{i=0}^{n} (p_{i,2} - p_{i,1}),$$

wherein $p_{i,1}$ is a last known location of matched object i in the field of view of the first capture device, $p_{i,2}$ is a first known location of matched object i in the field of view of the second capture device, and n is the number of matched objects; and estimating the lane offset variance parameter as $$\frac{1}{n-1} \sum_{i=0}^{n} (p_{i,2} - p_{i,1} - l_m)^2.$$

15. A non-transitory computer readable storage medium tangibly embodying a program of instructions executable by a machine to determine transition parameters between objects appearing in a first image captured by a first capture device and objects appearing in a second image captured by a second capture device, comprising the steps of:

receiving at least one first image captured by a first capture device, the at least one first image depicting a first multiplicity of objects;

obtaining a kinematic value for each of the first multiplicity of objects;

receiving at least one second image captured by a second capture device, the at least one second image depicting a second multiplicity of objects; and analyzing the at least one first image, the at least one second image, and the kinematic value to determine transition parameters related to transition of objects from a first field of view of the first capture device to a second field of view of the second capture device, wherein determining the transition parameters comprises:

selecting from a first initial multiplicity of objects appearing in the at least one first image a first potential multiplicity of objects and selecting from a second initial multiplicity of objects appearing in the at least one second image a second potential multiplicity of objects, such that each of the first potential multiplicity of objects can plausibly be associated with one of the second potential multiplicity of objects, and each of the second potential multiplicity of objects can plausibly be associated with one of the first potential multiplicity of objects;

responsive to determining the first potential multiplicity of objects and the second potential multiplicity of objects, creating a correspondence data structure between the first potential multiplicity of objects and the second potential multiplicity of objects;

selecting from the correspondence data structure a multiplicity of matches between objects captured by the first capture device and objects captured by the second capture device; and determining the transition parameters based on locations of the objects in the multiplicity of matches, and kinematic parameters of the objects in the first potential multiplicity of objects, wherein the first capture device and the second capture device are calibrated, wherein a gap exists between the first field of view and the second field of view, and wherein said transition parameters are usable for associating further objects captured by the first capture device with corresponding objects captured by the second capture device.

* * * * *

UNITED STATES PATENT AND TRADEMARK OFFICE
CERTIFICATE OF CORRECTION

PATENT NO. : 9,947,107 B2
APPLICATION NO. : 14/855762
DATED : April 17, 2018
INVENTOR(S) : Stephan Krauss It is certified that error appears in the above-identified patent and that said Letters Patent is hereby corrected as shown below:

In the Claims

At Claim 7, Column 16, Line 49, delete "wherein $p_{i,1}$ is a last known location of matched object in a" and insert --wherein $p_{i,1}$ is a last known location of matched object $i$ in a--

At Claim 13, Line 18, Column 18, delete "wherein equals a distance between a location of the second" and insert --wherein $\Delta s$ equals a distance between a location of the second--

At Claim 13, Line 21, Column 18, delete "the first capture device, $\Delta t$ and is a time difference between" and insert --the first capture device, and $\Delta t$ is a time difference between--

Signed and Sealed this
Tenth Day of July, 2018

Andrei Iancu
*Director of the United States Patent and Trademark Office*